United States Patent
Myana et al.

(10) Patent No.: US 8,474,693 B1
(45) Date of Patent: Jul. 2, 2013

(54) AUTOMATED BANKING MACHINE SECURITY SYSTEM AND METHOD

(75) Inventors: Jagadesh Myana, North Canton, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 4408 days.

(21) Appl. No.: 09/996,498

(22) Filed: Nov. 29, 2001

Related U.S. Application Data (60) Provisional application No. 60/251,429, filed on Dec. 5, 2000.

(51) Int. Cl.
*G07F 19/00* (2006.01)
*G06Q 40/00* (2006.01)
*G07D 11/00* (2006.01)

(52) U.S. Cl.
USPC .......................................................... 235/379

(58) Field of Classification Search
USPC ............. 235/379, 380; 713/182, 172; 705/21, 705/14, 43
See application file for complete search history.

(56) References Cited

U.S. PATENT DOCUMENTS

| | | | | |
|---|---|---|---|---|
| 3,996,450 A * | 12/1976 | Kerkhoff | | 235/380 |
| 4,355,369 A * | 10/1982 | Garvin | | 235/379 |
| 5,984,509 A * | 11/1999 | Scott | | 700/237 |
| 6,505,772 B1 * | 1/2003 | Mollett et al. | | 235/379 |
| 6,629,636 B1 * | 10/2003 | Hayashi et al. | | 235/383 |
| 7,025,256 B1 * | 4/2006 | Drummond et al. | | 235/379 |
| 7,036,738 B1 * | 5/2006 | Vanzini et al. | | 235/486 |
| 7,077,312 B2 * | 7/2006 | Putman et al. | | 235/379 |
| 7,117,369 B1 * | 10/2006 | Burns et al. | | 713/182 |

OTHER PUBLICATIONS www.wikipedia.org, "Microsoft Windows History".*
www.totalsem.com, "Total Seminars: Book Errata".*
technical.philex.com, "PHILEX networking theory and practice".*
tutorials.intelligentedu.skillspride.com, "Logging onto Windows XP".*

* cited by examiner

*Primary Examiner* — Thien T Mai
(74) *Attorney, Agent, or Firm* — Ralph E. Jocke; Daniel D. Wasil; Walker & Jocke (57) ABSTRACT

An automated banking machine (10, 30) includes a computer (32) that is operative to output a plurality of desktop environments through a display device (44) of the machine. The desktop environments may include a consumer desktop (54) and a maintenance desktop (58). The consumer desktop is generally empty of visual desktop elements such that when consumer user interface applications (40) are not producing visible outputs, only a background (55) portion of the consumer desktop is viewable. The maintenance desktop includes selectable desktop elements which are configured to conveniently launch terminal maintenance and configuration applications. The machine further includes input devices (46) such as a keyboard (52) and/or a switch device (50). A desktop switching application (36) is operative in the computer. The desktop switching application is operative responsive to specific input signals from the input devices to switch the current desktop between the consumer and maintenance desktops.

12 Claims, 4 Drawing Sheets

OPTinet - Security — 70

Logon Information: ATM UI Desktop

| Switch Desktops | Shut Down | Cancel |

OPTinet - Switch Desltop — 76

Select Desktop and user name and password for access:

Desktop
- ● Default
- ○ Maintenance

80 →

User Name: [ ]
Pasword: [ ]
Domain: [Financial_Domain ▽]

| OK | Cancel | Help |

OPTinet - Shut Down Requested — 78

This ATM machine is locked in a running state.
Shutting down will terminate ATM functions.
Please enter an administrator User Name and Password
to shutdown the machine.

Desktop
- ● Shutdown
- ○ Restart

84 →

User Name: [ ]
Pasword: [ ]
Domain: [Financial_Domain ▽]

| OK | Cancel | Help |

AUTOMATED BANKING MACHINE SECURITY SYSTEM AND METHOD

CROSS REFERENCE TO RELATED APPLICATION

This application claims benefit under 35 U.S.C. §119(e) of Ser. No. 60/251,429 filed Dec. 5, 2000.

TECHNICAL FIELD

This invention relates to automated banking machines. Specifically this invention relates to an automated banking machine system and method which provides enhanced security.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to transfer funds or to cash checks. Other types of automated banking machines may print or dispense items of value such as coupons, tickets, wagering slips, vouchers, checks, food stamps, money orders, scrip or travelers checks. For purposes of this disclosure an automated banking machine, automated transaction machine or ATM shall be defined to encompass any device which carries out transactions including transfers of value.

Some automated banking machines include an operating system platform that is operative to output through a display a graphical or text based workspace. Such systems may further include one or more terminal software components which are operative to output through a display a user interface which completely covers the workspace. In some situations when an error occurs in a terminal software component which terminates the component, portions of the workspace may become visible to consumers operating the machine. Such an occurrence is undesirable, because a consumer may be able to gain unauthorized access to non-consumer applications and portions of the underlying operating system. Consequently there exists a need for an automated banking machine that is operative to limit the opportunity for unauthorized users to access the machine through the workspace environment of the machine.

Operating systems of some automated banking machines may include functionality for shutting down the machine using a standard key sequence which is generally known to the public. For example a common key sequence used with Microsoft Windows® 9x, ME, NT, 2000, XP and DOS operating systems is the Ctrl-ALT-Del sequence. When all three of the Ctrl, ALT, and Delete keys of a keyboard are pressed at the same time, the operating system may either reboot the machine or present the user with an operating system screen. The operating system screen may for example include an option for shutting down the machine or other options for ending tasks or logging on with a new user account. Although automated banking machines may have full alphanumeric keyboards which are located out of the reach of consumers, other individuals such as employees of the institution which owns or operates the automated banking machine or personnel servicing the machine may have access to the interior of the machine including the full alphanumeric keyboard. By using the publicly known Ctrl-ALT-Del key combination for example, such a person may attempt to compromise the security of the automated banking machine and gain access to functionality portions of the machine. Consequently there exists a need for an automated banking machine which is operative to limit the ability of a person to compromise the security of an automated banking machine by typing special key combinations.

DISCLOSURE OF INVENTION

It is an object of an exemplary form of the present invention to provide an automated banking machine at which a user may conduct transactions.

It is a further object of an exemplary form of the present invention to provide an automated banking machine that limits user access to certain software functions of the machine.

It is a further object of an exemplary form of the present invention to provide an automated banking machine that restricts user access to certain software functions of the machine when a terminal software component terminates unexpectedly.

It is a further object of an exemplary form of the present invention to provide an automated banking machine that restricts user access to certain software functions of the machine that may be attempted to be accessed through portions of a workspace environment.

It is a further object of an exemplary form of the present invention to provide an automated banking machine that restricts user access to certain software functions of the machine that may be attempted to be accessed through input of certain key sequences or key combinations.

Further objects of exemplary forms of the present invention will be made apparent in the following Best Modes for Carrying Out Invention and the appended claims.

The foregoing objects are accomplished in an exemplary embodiment by an automated banking machine that includes at least one output device such as a display screen, and at least one input device such as a touch screen, function keys, keypad, card reader and/or keyboard. The automated banking machine further includes devices such as a dispenser mechanism for sheets of currency, a printer mechanism, a card reader/writer, a depository mechanism and other transaction function devices that are used by the machine in carrying out transactions.

The automated banking machine is in operative connection with at least one computer. The computer is in operative connection with the output devices and the input devices, as well as with the transaction function devices in the banking machine. The computer includes software programs that are executable therein. The software may include an operating system which is operative to cause the computer to output through the display screen a plurality of configurable desktop environments. A desktop includes the background portion and visual and non-visual functional features of the user interface provided through the operating system. Software programs operating in the computer include applications. User interface screens produced by applications are generally positioned on top of the background and/or visual functional features of the desktop. Desktop functional features may include elements that can be selected, manipulated or otherwise used to provide inputs and may include visual elements such as icons, start buttons, task bars, menu bars, tool bars, and panels. Desktop functional features may also or alternatively include non-visual elements such as short-cut keys, or voice activated selections.

The exemplary operating system may be configured to output selectively a plurality of different desktops including for example, a maintenance desktop, a consumer desktop, and a default desktop. The maintenance desktop may be operatively configured to receive inputs that cause the computer to execute maintenance applications such as for example functions related to the configuration, diagnostics, troubleshooting, servicing, and/or repair of the automated banking machine. The maintenance desktop may include for example, desktop icons, quick launch buttons, start up menu items, toolbars, panels, or any other visual or non-visual element which corresponds to a functional feature provided through the desktop, and which when actuated through at least one input, causes the computer to launch or configure maintenance applications. In an exemplary embodiment the maintenance applications may only be launched when a user has logged onto the machine with a user account that has sufficient permission to execute maintenance applications.

The consumer desktop may be used as the active or current desktop when the automated banking machine is operating in a consumer operation mode. When the machine is in the consumer operation mode, the computer may be operative responsive to at least one input to execute at least one consumer user interface application represented by an element on the consumer desktop. Such a user interface application may enable a consumer to perform transactions with the machine such as for example the withdrawal of cash from the user's account through operation of the cash dispenser or the transfer of value between financial accounts. In one exemplary embodiment, the operating system of the machine may be operative to load the consumer desktop initially when the computer is started or rebooted.

The exemplary consumer desktop is operative to only show a consumer desktop background on the portion display. Desktop functional elements including desktop icons, a start button, panels, menu bars, and/or task bars may be removed or otherwise hidden from the background portion of the consumer desktop. Consequently when the system is started or when user interface applications terminate, only the background portion of the consumer desktop will be visible to the consumer through the display screen. In one exemplary embodiment, the background portion of the consumer desktop may be generally blank. However, in alternative embodiments, the background portion may include a bitmap graphic, text message, advertisement, or any other visual indicia or information.

The exemplary default desktop may include desktop elements representative of functional features that are associated with a default installation of the operating system. For example with a Microsoft Windows 9x/NT/2000/XP operating system, the default desktop may include a task bar and desktop icons such as "My Computer," "Network Neighborhood," and "Recycle Bin." For a Unix or GNU/Linux operating system, the default desktop may include icons, panels and menu bars associated with the installed window manager such as KDE or GNOME.

In an exemplary embodiment, one or more individual user accounts established through configuration of the operating system may have sufficient privileges to cause the computer to operate responsive to at least one input to switch to a selected one of the different maintenance, consumer, and default desktops. In alternative exemplary embodiments, each desktop may correspond to one or more different user accounts, such that each user account has a different default desktop with different element configurations for selecting desktop functional features such as icons, panels, task bars and menus. For example, the maintenance desktop may be associated with one or more maintenance user accounts, the consumer desktop may be associated with one or more consumer user accounts, and the default desktop may be associated with one or more additional user accounts.

In embodiments in which different user accounts may be associated with different desktops, the computer may be programmed such that each of the user accounts has different levels of privileges or authority to access and carry out functions of the machine. For example, maintenance user accounts may be associated with broad administrative privileges with sufficient rights to configure the software and hardware of the automated banking machine. The consumer user accounts may be associated with privileges which are limited to only those rights necessary to execute consumer user interface applications and perform transaction functions through the operation of the consumer user interface applications.

Embodiments may have additional desktops and associated user accounts. For example the primary administrator account or root user account, may be associated with its own desktop or may be associated with the maintenance or default desktop configurations. In addition, for systems that have multiple user accounts of the same general type, each user account may be linked to the same desktop, or each user account may be associated with its own desktop. For example in an exemplary embodiment, two maintenance user accounts may be configured to use the same maintenance desktop configuration, whereas in a further exemplary embodiment, each maintenance user accounts may be associated with their own individually configurable maintenance desktops. Various categories of users may also have access rights to a particular desktop configuration.

The exemplary embodiment of the automated banking machine includes a desktop switching application which causes the computer to generate desktop switching and shutdown user interface windows when a user inputs a key sequence or key combination such as Ctrl-Alt-Del. The desktop switching application enables a user to switch to another desktop only if a user logs into the machine with a user account that has sufficient permission to switch to another desktop. In the exemplary embodiment, a consumer user account does not have sufficient permission to switch to another desktop. As a result in order to switch the machine from the consumer desktop, a user must provide inputs corresponding to a maintenance user account or another user account which has been granted permission to switch desktops. When desktop switching or shutdown windows are being displayed, if a user does not successfully select a desktop or shutdown option within a programmed time out period, the desktop switching application is operative to hide the desktop switching and/or shutdown user interface windows and redisplay the current desktop.

The exemplary automated banking machine may further include a key sequence configuration application operating in the computer. The key sequence configuration application enables a user logged on with maintenance and/or administrative privileges to modify the keys of the key sequence that is operative to launch the user interface windows associated with the desktop switching application. Using the key sequence configuration application, the machine may be configured to be responsive to a selected key sequence or key combination other than the commonly known Ctrl-Alt-Del key combination.

In a further exemplary embodiment the desktop switching application may be operative responsive to a switch device located within a secure enclosure of the machine. When the switch device is activated by a user who is authorized to access the secure enclosure, the desktop switching application is operative to cause the computer to detect this occurrence and to output the maintenance desktop. The exemplary desktop switching application may be further operative to cause the computer to load one or more terminal maintenance applications whose functions can be selected through the maintenance desktop. Prior to switching to the new desktop, the desktop switching application may be further operative to close previously running applications such as the consumer user interface applications. In addition, when the switch device is activated, the desktop switching application may further be operative to cause the computer to prompt the user to enter a maintenance user account or may be operative to automatically switch the current user account to a maintenance user account.

BEST MODES FOR CARRYING OUT INVENTION

Figure 1:
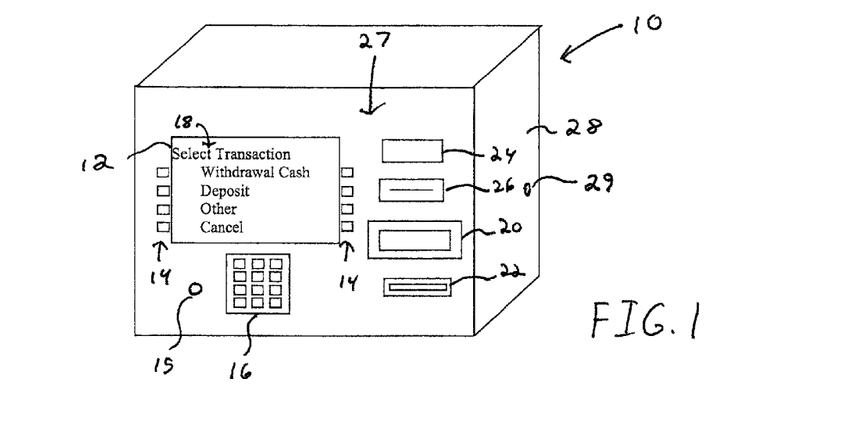
FIG. 1 is a perspective view of an exemplary embodiment of an automated banking machine.

Referring now to the drawings and particularly to FIG. 1, there is shown therein a perspective view of an exemplary automated banking machine or ATM 10. The automated banking machine 10 includes at least one output device such as a display device 12. The output device 12 is operative to provide a consumer with a user interface 18 that may include a plurality of selectable options for operating the machine. The exemplary embodiment may further include other types of output devices such as speakers, or any other type of device that is capable of outputting visual, audible, or other sensory perceptible information.

The exemplary embodiment of the automated banking machine 10 includes a plurality of input devices such as function keys 14, a keypad 16 as well as a card reader 26. The exemplary embodiment may further include or utilize other types of input devices such as microphones, or any other device that is operative to provide the machine with inputs representative of consumer communication. The machine may also include one or more biometric reader devices 15 such as a fingerprint scanner, an iris scanner, facial recognition device, hand scanner, or any other biometric reader device which may be used to read a biometric input that can be used to identify a user.

The exemplary automated banking machine 10 further includes a plurality of transaction function devices which may include for example, a sheet or cash dispenser 20, depositor 22, a receipt printer 24, and other devices. Consumers are enabled to provide and/or receive items from these transaction function devices through openings in a fascia 27. Internal portions of the automated banking machine are located within a secure enclosure 28. Access to inside the service enclosure is limited to authorized persons through use of a locking mechanism schematically indicated 29.

Figure 2:
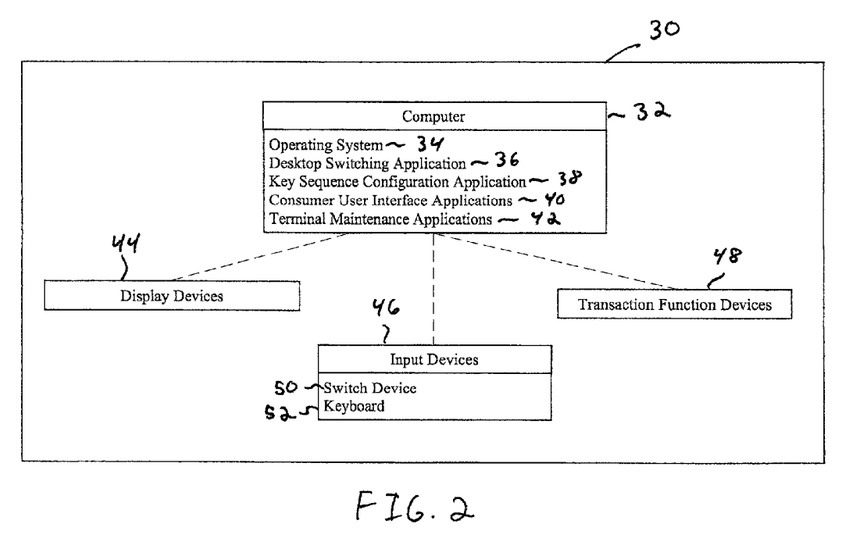
FIG. 2 is a schematic view of a further exemplary embodiment of an automated banking machine.

FIG. 2 is a schematic representation of an exemplary automated banking machine 30 which is similar to ATM 10. Here the machine 30 includes at least one computer 32 which is in operative connection with a plurality of software components. These software components include an operating system 34, at least one desktop switching application 36, at least one key sequence configuration application 38, at least one consumer user interface application 40, and at least one maintenance application 42. In addition the computer 32 is in operative connection with a display device 44, input devices 46, and transaction function devices 48.

The computer responsive to a consumer user interface application 40, is operative to output a user interface through the display device 44. The computer, responsive to operation of the consumer user interface application 40 and consumer inputs through the input devices, causes transaction functions to be performed through operation of the transaction function devices 48. These functions may include for example the dispensing of cash with a cash dispenser, the deposit of items within a depository, and the transfer of value between financial accounts.

The exemplary automated banking machine 30 is operative to provide authorized users with access to functions provided by one or more of the maintenance applications 42. The computer is operative responsive to maintenance applications to enable the performance of one or more maintenance functions such as configuration, maintenance, testing operation of devices, servicing, and repair of the machine 30. These applications may provide for example, error logs, diagnostic and troubleshooting features, and access to modifiable parameters for configuring the machine. These maintenance applications may further enable a user to maintain, configure, operate and/or test transaction function devices in operative connection with the machine.

Figure 3:
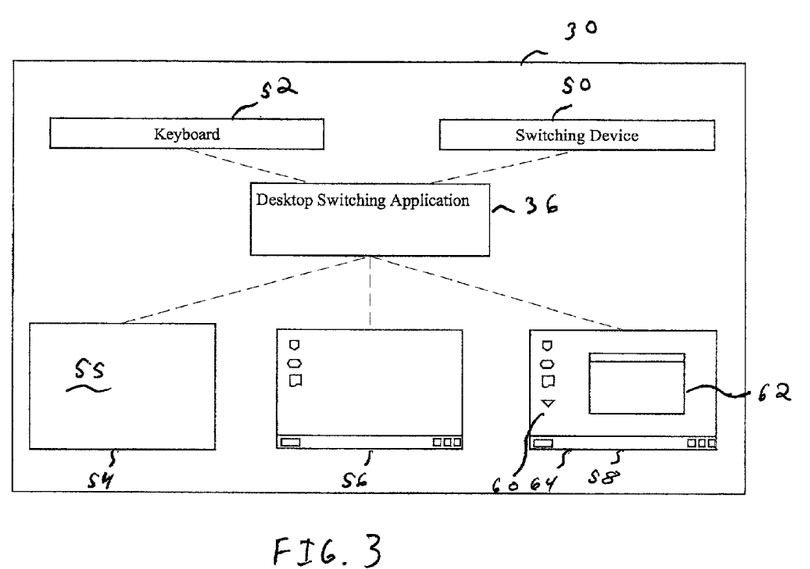
FIG. 3 is a schematic view showing an exemplary desktop switching application and exemplary automated banking machine desktops.

In the exemplary embodiment, the computer responsive to the operating system 34 is operative to selectively output through the display device a plurality of customizable desktop environments. These desktops may be managed by the desktop switching application 34. As shown in FIG. 3, the desktop switching application 34 may be operative responsive to input signals produced by one or more inputs through input devices such as a keyboard 52 and a switch device 50, to cause the computer to alter the active current desktop being presented, between a plurality of desktops 54, 56, and 58. In an exemplary embodiment, these desktops may include a consumer desktop 54, a default desktop 56, and a maintenance desktop 58.

For example, when it is necessary to run the exemplary terminal maintenance applications, the computer of the exemplary machine is operative responsive to the actuation of the switch device 50 to cause the computer to change the one current desktop output through the display device on the machine from the consumer desktop 54 to the maintenance desktop 58. An exemplary switch device 50 may include a rocker switch, a push button switch, or any other type of switch that can be manipulated or actuated by a user to cause one or more signals to be detected through operation of the computer. In an exemplary embodiment, the switch device 50 may be housed within a secure enclosure of the machine. As a result, only individuals with access to the inside of the secure enclosure will have the ability to actuate the switch device 50 to cause the current desktop to be switched to the maintenance desktop. In some exemplary embodiments, the switch device 50 may be located within a vault or chest of the automated banking machine. In some exemplary embodiments, the desktop switching device may also be operative responsive to the actuation of the switch device 50 to have the computer operate to change the current desktop from the maintenance desktop 58 to the consumer desktop 54.

The exemplary desktop switching application may also be operative to cause the computer to operate to enable desktop switching responsive to a specific sequence or combination of keys that is typed into a plurality of keys such as the keyboard 52. In one exemplary embodiment the desktop switching application may be operative responsive to a Ctrl-Alt-Del key combination to cause the display device on the machine to output a window that includes features for selecting a desktop. In an exemplary embodiment, the computer may include a key sequence or combination configuration application that is operative to replace the commonly known Ctrl-Alt-Del key combination with a non-publicly known key sequence or combination. As a result individuals who do not know the key sequence or combination for the machine will not be able to activate the desktop switching application. In some embodiments the key sequence or combination application operates the computer responsive to one or more authorized user inputs to input devices on the machine, to operate responsive to a user selected sequence or combination of inputs. Of course in other embodiments other approaches for providing at least one desktop switching input to the machine may be utilized.

In an exemplary embodiment, the maintenance desktop 58 may include visual and non-visual features or elements that have been specifically configured and organized to launch maintenance applications 62. Users are enabled to cause the computer to operate to cause the machine to perform the functions provided by a selected maintenance application, by providing one or more inputs through one or more input devices on the machine corresponding to selection of the selectable element on the desktop corresponding to the maintenance application. In embodiments of desktop environments that allow icons to be placed on the desktop, the exemplary maintenance desktop may include icons 60 which are selected for launching the maintenance applications 62. In embodiments of desktop environments that include selectable menus, the exemplary maintenance desktop may include menu items for launching maintenance applications 62. In embodiments of desktop environments that include a panel or tool bar 64, the exemplary maintenance desktop may include selectable buttons on the tool bar for launching maintenance applications 62. In embodiments of desktop environments that include short-cut keys, the exemplary maintenance desktop may be operative to launch terminal maintenance applications 62 responsive to the detection of specific combinations of keyboard keys. Input devices included in operative connection with the computer for providing inputs selecting selectable elements may include for example, a touch screen, mouse, keys, touch pad, speech recognition or other type or combination of input devices.

In addition or as an alternative to a user manually launching maintenance applications using the selectable elements of the maintenance desktop, in some embodiments maintenance applications may be automatically launched. For example, when the maintenance desktop is being or has been loaded, the computer may be operative in accordance with its programming to automatically start one or more maintenance applications 62 without further inputs from a user.

For running the consumer user interface applications, the computer responsive to the exemplary desktop switching application 36 is operative to selectively switch the desktop environment to the consumer desktop 54. The exemplary consumer desktop 54 is configured to be empty of selectable desktop elements such as icons, tool bars, menus, buttons or other features which can be selected or otherwise activated by user inputs to achieve the launching or configuration of applications including maintenance applications. Consequently when the machine 30 initially starts or is being shut down, consumers viewing the desktop environment through the display screen will generally only be able view the background portion 55 of the desktop. The desktop background portion 55 will also be viewable when a consumer user interface application terminates unexpectedly due to an error. By eliminating viewable desktop elements related to launching or configuring applications, the consumer is prevented from seeing or attempting to select icons or other desktop functional features that may otherwise be accessible when a consumer user interface application (which would otherwise cause the display device to provide outputs associated with conducting consumer transactions) is not operating to cause the display device to provide such outputs.

In exemplary embodiments, the background portion 55 of the consumer desktop may include non-functional features or indicia such as a blank screen, a bitmap wallpaper, an advertisement, or instructional information. For example in one exemplary embodiment of the present invention, the wall paper of the consumer desktop background may include a message with indicia representative of the automated banking machine not being available for service.

For accessing features of the machine that may not be associated with the maintenance desktop, the exemplary desktop switching application may further be operative to switch the desktop environment to a default desktop 56. The default desktop may include desktop features such as icons, menus, and tool bars which may be associated with a generic installation of the operating system on the computer of the machine 30. Although the default desktop 56 may be further customized to serve a more specialized purpose, in general the default desktop 56 may be configured to provide a user with desktop features for configuring the operating system of the computer and for launching applications generally associated with a default installation of the operating system.

Figure 4:
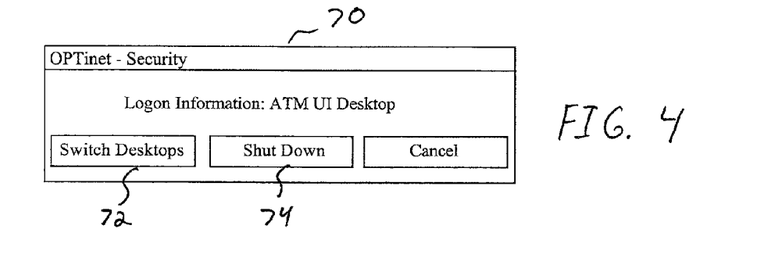
FIGS. 4-7 are representative of dialog windows of the exemplary desktop switching application.

FIGS. 4-7 are representative of the exemplary user interface windows that may be displayed responsive to the desktop switching application and a user providing at least one switching input through at least one input device. The at least one switching input may include, for example as previously discussed, activating a switching device in the machine enclosure or keying in the correct key sequence or combination with a keyboard. FIG. 4 shows a desktop switching user interface which includes a window 70 having a plurality of selectable buttons 72 and 74. The buttons correspond to functions available through the desktop switching application. These selectable buttons may include a switch desktops button 72 and a shut down button 74. The computer is operative responsive to desktop switching application and at least one selection input from a user, such as a user clicking or otherwise selecting the switch desktops button 72, to display the user interface window 76 shown in FIG. 5. In addition, the computer operates responsive to the desktop switching application and a user clicking or otherwise selecting the shutdown button 74 to display the user interface window 78 shown in FIG. 6.

Figure 5:
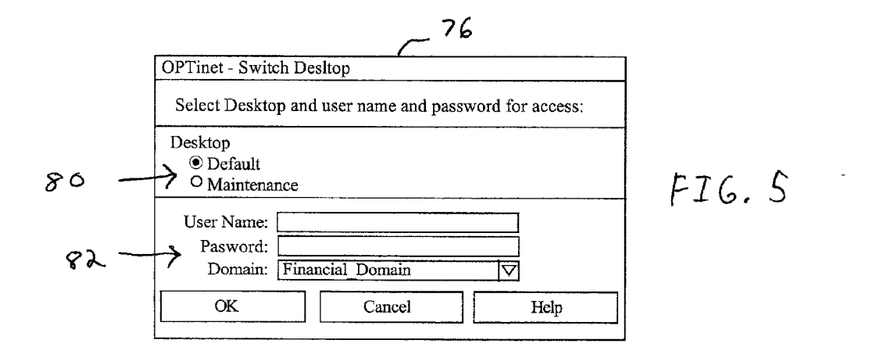
Figure 6:
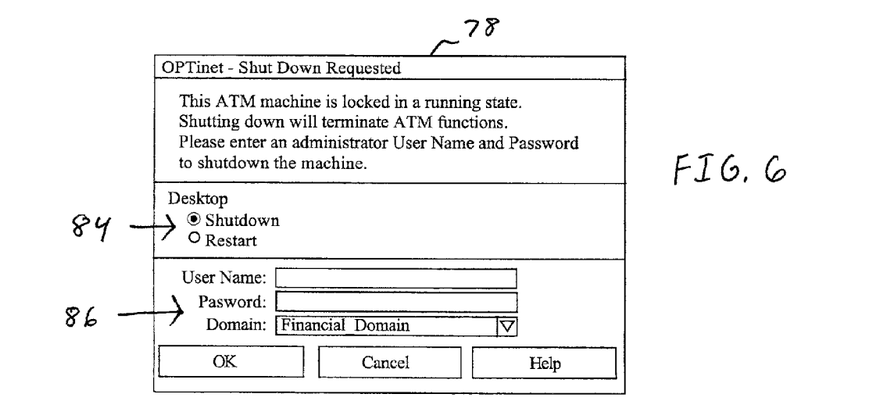

The exemplary desktop switching user interface window 76 as shown in FIG. 5 includes selectable elements 80 which enable a user to provide one or more inputs to select a desired desktop from a listing of available desktops. The user interface window 76 may further include entry fields comprising boxes 82 which are fellable with entry data responsive to user inputs through one or more input devices. In the exemplary embodiment the user provides inputs to include in entry fields user account information such as a user name and password. The exemplary user interface window 78 as shown in FIG. 6 includes selectable elements 84 which enable a user to select a complete shutdown of the machine or a shutdown with a restart of the machine. The window 78 further includes entry boxes 86 for a user to provide user account information such as a user name and password.

The exemplary automated banking machine may require a user to enter user account information which corresponds to predetermined data, which indicates that the user has sufficient permissions to switch the current desktop and/or shut down the machine. The user account information required to be input in an exemplary embodiment generally corresponds to a user account with at least one of administrator, root, or maintenance privileges. An exemplary administrative or maintenance user account may be authorized to switch desktops, shut down the machine, launch terminal maintenance applications, and configure the operating system and other applications of the machine. Of course in other embodiments the computer may be variously programmed to allow a user to perform types of activities based on the entry of predetermined data that is input to the machine to identify the particular, type and/or category of user.

In an alternative exemplary embodiment, the desktop switching application may authorize a user to switch desktops responsive to input of biometric data by of the user. For example, rather than requiring a user to type a user name and password into the entry boxes 82, 86 the desktop switching application may prompt the use to provide at least one input to a biometric reader device. For example, if the biometric reader device includes a fingerprint scanner, the user may press a finger against the fingerprint scanner. When the data input through the scan of the fingerprint corresponds to an authorised user account, the desktop switching application is operative to enable the switching of the current desktop or the shutting down of the machine.

In an exemplary embodiment, the user accounts may correspond to operating system user accounts established with the operating system of the automated banking machine or with the operating system of a trusted server connected to the automated banking machine. In other exemplary embodiments, the user accounts may be configured in a data store associated with one or more applications accessed by the automated banking machine.

When the banking machine is operating in a consumer mode, a user account may be logged into the machine which corresponds to a consumer user account with limited privileges. For example, the consumer user account may have permissions for launching at least one consumer user interface application and performing transactions with transaction function devices through the use of the consumer user interface application. However, the consumer user account may not have permission to switch desktops, shut down the machine, run maintenance applications, or configure the operating system.

For example, in some embodiments consumer user account data may include data input by a user, such as data read from a card or other article, or data read from a biometric reader device. In such cases the correspondence between the user input data to predetermined data determines the capabilities of the consumer applications the user is enabled to use. In other embodiments a single consumer user account may be logged in as a default for purposes of conducting consumer transactions for a plurality of users at the machine. Of course various approaches may be used in other embodiments.

When the desktop switching application detects entry of at least one switching input such as a key sequence from the keyboard or a switch device signal from an internal switch device, while the machine is in a consumer mode, the computer responsive to the exemplary desktop switching application may be operative to first prompt a user to enter user account information prior to switching desktops or shutting down the machine. Such user account data may correspond to predetermined data for a particular user or a particular category of user for which the computer has been programmed to give sufficient administrative and/or application permissions for the user to switch desktops, shut down the machine, run maintenance applications, and/or configure the operating system.

In an exemplary embodiment, user accounts may not be associated with only a single desktop. As a result a logged in user account with sufficient privileges may be able to switch the current desktop to another desktop while remaining logged in. In alternative exemplary embodiments, one or more user accounts may be linked in computer accessible memory to a specific desktop. In such a system when the user account initially logs into the machine, the current desktop may be automatically changed by the computer to the desktop associated with the user. For example, when a consumer user account logs in, the current desktop is changed to an associated consumer desktop; and when a maintenance user account logs in, the current desktop is changed to an associated maintenance desktop.

In addition or in the alternative, when a previous user account and desktop exist, the desktop switching application may be operative to log out the previous user account, prior to logging in the new user account associated with the new desktop. For example, when switching from a consumer desktop to a maintenance desktop, the desktop switching application may be operative to log out a consumer user account associated with the consumer desktop, and log in a maintenance user account which is associated with a maintenance desktop. When switching from a maintenance desktop to a consumer desktop, the computer responsive to the desktop switching application may be operative to log out a maintenance user account associated with the maintenance desktop, and log in a consumer user account which is associated with a consumer desktop.

In exemplary embodiments, user account may be associated with a single common desktop. For example, a plurality of maintenance user accounts may be associated with a common maintenance desktop such that when each maintenance user account is logged in, the current desktop switches to the same common maintenance desktop. In other exemplary embodiments a user's account may be associated with its own independent desktop. For example, each one of a plurality of maintenance user account may be associated with its own separately configurable maintenance desktop.

When the current desktop corresponds to a consumer desktop, the computer responsive to the desktop switching application and input of at least one switching input, may be operative to display the desktop switching user interface window 76 shown in FIG. 5. This user interface window may include selectable elements 80 for switching the consumer desktop to the maintenance desktop. This user interface window may further include other selectable options for switching the consumer desktop to other available desktops such as a default desktop.

Figure 7:
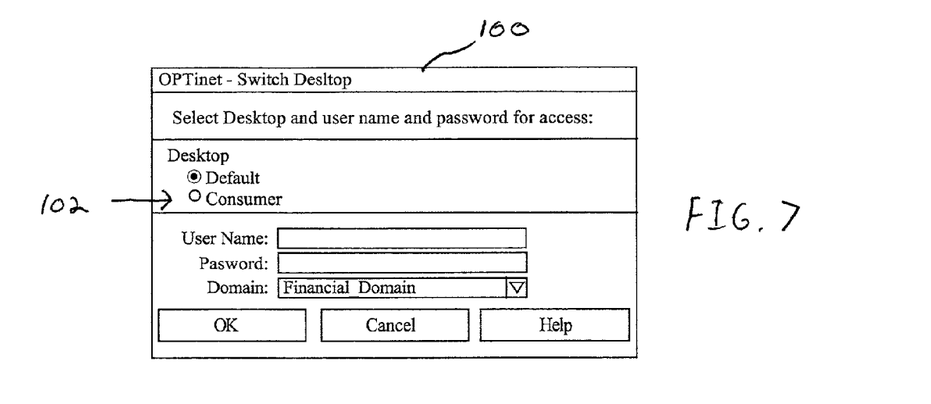

FIG. 7 shows an example of a desktop switching user interface window 100 that may be displayed when the current desktop corresponds to a maintenance desktop. The user interface window includes a selectable element 102 for switching the current desktop from the maintenance desktop to the consumer desktop. The user interface window may also include other selectable options for switching the current desktop to other desktops, including for example, the default desktop. As shown in FIG. 7, the user interface window 100 may include entry boxes 82 for a user to provide user account information such as a user name and password, which has sufficient permission to switch desktops. However, in alternative exemplary embodiments, the desktop switching application may not require a user to enter user account information when switching from a maintenance desktop to a consumer desktop.

For example, when a user provides at least one switching input to return to the consumer desktop, the computer may operate in accordance with its programming to automatically log out the current user account and log in a previously specified consumer user account. In some exemplary embodiments, when the current desktop is switched to a consumer desktop, the computer may be programmed to automatically cause the computer to launch a consumer user interface application. The consumer user interface application may cause the computer to output a consumer user interface through the display device which is operative to cover the consumer desktop background. In addition, in exemplary embodiments, when the current desktop is switched to a maintenance desktop, the computer may be operative to automatically close the consumer user interface application and launch a maintenance application. Also, in some embodiments when the current desktop is switched to a consumer desktop, the computer may be operative to automatically close at least one maintenance application and launch at least one consumer user interface application.

The exemplary desktop switching application is operative to cause the computer to continuously display one or more desktop switching user interface windows for a programmed amount of time considered sufficient to enable a user to make a selection and/or enter user account information. In the event a selection and/or user account information is not provided within the programmed amount of time, an exemplary embodiment is operative to automatically remove a desktop switching user interface screen from view, leaving the current desktop and/or currently running applications in view.

In an alternative exemplary embodiment, when a non-consumer desktop is currently active such as the maintenance desktop or the default desktop, the computer in the automated banking machine is programmed to monitor the machine for any absence in user inputs. When a pre-established amount of time has passed without user inputs to the machine, the computer operates to automatically log out the current user account, log in the consumer user account, and/or switch the current desktop to the consumer desktop. When this occurs in some embodiments, the computer may operate so that at least one consumer user interface application is launched. In other embodiments, a consumer user interface application may not be launched, and instead a message may be displayed on the consumer desktop which indicates that the machine is not available for service. Such a message may be included in the background of the consumer desktop or may be associated with a user interface window being displayed on the consumer desktop.

In exemplary embodiments, the software operating in the at least one computer may reside on and/or be loaded from computer readable media. Such media may include for example, CDs, floppy disks, hard disks, proms, memory cards or other types of media for holding instructions which may be carried out by a computer.

Thus the new automated banking machine and system of the present invention achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The inclusion of an Abstract herewith shall not be deemed to limit the invention to those features described in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
    (a) operating at least one data reader of an automated banking machine while the machine is in a consumer display mode, to read user data that is associated in at least one data store with a person authorized to use the machine,
        which machine includes the at least one data reader, at least one display device, at least one processor, and a display mode switching application executable by the at least one processor,
            which display mode switching application allows the machine to be operated in different display modes, including a maintenance display mode and the consumer display mode,
                which when the machine is in the maintenance display mode, an authorized servicer can use the machine to perform at least one machine maintenance function that is not performable when the machine is in the consumer display mode,
                which when the machine is in the consumer display mode, an authorized customer can use the machine to carry out at least one financial transaction that cannot be carried out when the machine is in the maintenance display mode;
    (b) subsequent to (a) and while the machine is still in the consumer display mode, operating the machine to receive from the person, at least one input corresponding to a first request to switch display modes;
    (c) operating the at least one processor responsive at least in part to the first request received in (b), to cause the at least one display device to output at least one first user interface for switching display modes,
        which at least one first user interface includes:
            a request for servicer data, and
            at least one user-selectable machine display mode that comprises a maintenance display mode;
    (d) subsequent to (c) and while the machine is still in the consumer display mode, operating the machine to receive from the person:
        servicer data, and at least one selection input corresponding to user selection of the maintenance display mode;
(e) operating the at least one processor responsive at least in part to a determination that the servicer data received in (d) is associated in at least one data store with authorization to perform the at least one machine maintenance function, to cause the machine to switch from the consumer display mode to the maintenance display mode;
(f) subsequent to (e) and while the machine is still in the maintenance mode, operating the machine to receive from the person, at least one input corresponding to a second request to switch display modes;
(g) operating the at least one processor responsive at least in part to the second request received in (f), to cause the at least one display device to output at least one second user interface for switching display modes,
which at least one second user interface includes at least one user-selectable machine display mode that comprises the consumer display mode;
(h) subsequent to (g) and while the machine is still in the maintenance display mode, operating the machine to receive from the person, at least one selection input corresponding to user selection of the consumer display mode; and
(i) operating the at least one processor responsive at least in part to the user selection received in (h), to cause the machine to switch from the maintenance display mode to the consumer display mode.

2. The method according to claim 1 and further comprising:
(j) operating the at least one processor to cause the at least one display device to output indicia corresponding to the servicer data received in (d).

3. The method according to claim 2 and further comprising:
(k) operating the at least one processor to cause the at least one display device to output indicia corresponding to the at least one selection input received in (d); and
(l) operating the at least one processor to cause the at least one display device to output indicia corresponding to the at least one selection input received in (h).

4. A method comprising:
(a) operating an automated banking machine while in a consumer mode, to output at least one mode switching interface through a machine display device that includes a touch screen,
wherein the machine includes at least one reader that is operable to read customer data usable to identify a financial account,
wherein the machine includes a cash dispenser,
wherein the machine is operable in different modes, including the consumer mode and a maintenance mode,
wherein the consumer mode allows an authorized customer to use the machine to carry out a cash dispense transaction that cannot be carried out when the machine is in the maintenance mode,
wherein the maintenance mode allows an authorized servicer to use the machine to perform at least one machine maintenance function that is not performable when the machine is in the consumer mode;
(b) subsequent to (a), operating the machine while still in the consumer mode and while the at least one mode switching interface is still being displayed, to:
(bi) receive user data that is usable to identify the user as an authorized servicer of the machine; and
(bii) receive through contact with the touch screen, user selection input that corresponds to user selection of the maintenance mode; and
(c) operating the machine responsive at least in part to (bi) and (bii), to switch from the consumer mode to the maintenance mode.

5. The method according to claim 4 wherein in (a) the at least one mode switching interface includes:
a request for the user data, and
a user-selectable option corresponding to the maintenance mode.

6. The method according to claim 4 and further comprising:
(d) operating the machine to output through the machine display device, indicia corresponding to the user data received in (bi).

7. The method according to claim 6 and further comprising:
(e) operating the machine to output through the machine display device, indicia corresponding to the user selection input received in (bii).

8. The method according to claim 4 and further comprising:
(d) subsequent to (c), operating the machine while still in the maintenance mode, to output at least one other mode switching interface through the machine display device;
(e) subsequent to (d), operating the machine while still in the maintenance mode and while the at least one other mode switching interface is still being displayed, to receive through contact with the touch screen, user selection input that corresponds to user selection of the consumer mode; and
(f) operating the machine responsive at least in part to (e), to switch from the maintenance mode to the consumer mode.

9. The method according to claim 8 wherein in (d) the at least one other mode switching interface includes a user-selectable option corresponding to the consumer mode.

10. The method according to claim 4 and further comprising:
(d) prior to (a), operating the machine to receive at least one mode switching input;
wherein (d) causes the machine to perform (a).

11. The method according to claim 10 wherein in (d) the at least one mode switching input is received through manual actuation of a switch device located within an interior are of the machine.

12. The method according to claim 10 wherein in (d) the at least one mode switching input is received through user input of a pre-established key combination through user input keys of the machine.

* * * * *